US008776033B2

(12) United States Patent
Low et al.

(10) Patent No.: US 8,776,033 B2
(45) Date of Patent: Jul. 8, 2014

(54) BATCH DISPATCH OF JAVA NATIVE INTERFACE CALLS

(75) Inventors: Andrew R. Low, Stittsville (CA); Marcel Mitran, Markham (CA); Kishor V. Patil, Toronto (CA); Gavin Rolleston, Ottawa (CA); Ivan Sham, Vancouver (CA); Karl M. Taylor, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/977,587

(22) Filed: Dec. 23, 2010

(65) Prior Publication Data

US 2012/0167067 A1    Jun. 28, 2012

(51) Int. Cl.
*G06F 9/44*         (2006.01)

(52) U.S. Cl.
USPC ......................................................... 717/148

(58) Field of Classification Search
USPC ......................................................... 717/148
See application file for complete search history.

(56) References Cited

U.S. PATENT DOCUMENTS

| | | | | |
|---|---|---|---|---|
| 6,481,006 | B1 * | 11/2002 | Blandy et al. ................. | 717/139 |
| 6,886,157 | B2 | 4/2005 | Long et al. | |
| 6,915,520 | B2 | 7/2005 | Sanchez, II | |
| 7,207,036 | B2 * | 4/2007 | Charnell ....................... | 717/140 |
| 7,296,272 | B2 * | 11/2007 | Kyriakides et al. ........... | 719/314 |
| 7,490,320 | B2 | 2/2009 | Kielstra et al. | |
| 2002/0066087 | A1 * | 5/2002 | Long et al. .................... | 717/148 |
| 2003/0182364 | A1 * | 9/2003 | Large et al. ................... | 709/203 |
| 2004/0040032 | A1 * | 2/2004 | Kyriakides et al. .......... | 719/328 |
| 2004/0117805 | A1 * | 6/2004 | Czajkowski et al. ......... | 719/331 |
| 2005/0060724 | A1 * | 3/2005 | Skinner et al. ................ | 719/328 |
| 2008/0141246 | A1 * | 6/2008 | Kuck et al. ........................ | 718/1 |
| 2010/0325291 | A1 * | 12/2010 | Balasaygun et al. .......... | 709/228 |
| 2012/0167067 | A1 * | 6/2012 | Low et al. ...................... | 717/148 |

FOREIGN PATENT DOCUMENTS

TW    484099 B      4/2002
WO    02/093366 A2  11/2002

OTHER PUBLICATIONS

IBM, JNI Handling Local References, IBM (Published Nov. 26, 2004) retrieved from http://publib.boulder.ibm.com/infocenter/javasdk/v1r4m2/index.jsp?topic=%2Fcom.ibm.java.doc.diagnostics.142j9%2Fhtml%2Fhandlocref.html on Oct. 21, 2013.*
Green, Java Glossary: JNI, Canadian Mind Products (Published Jun. 7, 2003) retrieved from http://web.archive.org/web/20030607062956/http://mindprod.com/jgloss/jni.html on Jul. 27, 2013.*

(Continued)

*Primary Examiner* — Don Wong
*Assistant Examiner* — Theodore Herbert
(74) *Attorney, Agent, or Firm* — Thomas E. Lees, LLC

(57) ABSTRACT

A batching mechanism is provided that batches multiple Java Native Interface calls together such that the batch crosses the Java Native Interface boundary in a single transition. The batching mechanism operates by identifying a sequence of Java Native Interface calls to be made by native code, by encapsulating the identified sequence of Java Native Interface calls into a batch, and by communicating the batch as a single transition across the Java Native Interface boundary. In this manner, each call of the batch is encapsulated by iteratively performing for each call to be made, processes including identifying the Java Native Interface function to call, identifying the arguments to pass into the Java Native Interface function, dispatching to the Java Native Interface function and capturing the return value.

19 Claims, 6 Drawing Sheets

(56) References Cited

OTHER PUBLICATIONS

Levon Stephananian, Angela Demke Brown, Allan Kielstra, Gita Koblents and Kevin Stoodley, "Inlining Java Native Calls At Runtime", VEE '05, Jun. 2005, Chicago, Illinois.

Dawid Kurzyniec and Vaidy Sunderam, "Efficient Cooperation between Java and Native Codes—JNI Performance Benchmark", Emory University, Dept. of Math and Computer Science, Atlanta, Georgia; The 2001 International Conference on Parallel and Distributed Processing Techniques and Applications, 2001.

* cited by examiner

BATCH DISPATCH OF JAVA NATIVE INTERFACE CALLS

BACKGROUND

Various aspects of the present invention relate generally to the interaction between native code and Java, and more particularly, to the efficient transfer of Java Native Interface calls across a Java Native Interface boundary.

A Java Virtual Machine (JVM) is an abstract computing machine that enables computer programs and data structures to use a virtual machine model for the execution of other computer programs and scripts. In general, Java Virtual Machines allow system designers to improve system scalability and exploit the capabilities of underlying physical machine(s), while providing isolation for applications executing in corresponding Java Virtual Machine instances.

While application isolation is often desirable, there are situations where a Java application requires functionality that is not provided by a standard Java Application Programming Interface (API). Accordingly, the Java Native Interface (JNI) provides a programming framework that allows interaction between non-Java languages and a Java Virtual Machine in a clearly defined manner. The Java Native Interface also establishes a clean boundary between native code and the Java Virtual Machine, making it possible to provide separate execution environments for the two components.

Thus, the pairing of a Java Native Interface and a Java Virtual Machine facilitates Java code running in a Java Virtual Machine to call and be called by native applications and libraries written in other languages. As a result, legacy applications can access the services available to Java. Correspondingly, Java applications can utilize native methods to handle situations that cannot be addressed entirely with Java code. In practice however, native code may be compiled with a first calling convention, e.g., OSLINK, which uses an upward growing stack. To the contrary, the Java Virtual Machine, and hence Java Native Interface implementations, may be compiled with a second calling convention, such as XPLINK, which uses a downward growing stack. As such, stack-swapping services may be required to transition between the two calling conventions in order for Java code to call and be called by certain native applications.

BRIEF SUMMARY

According to aspects of the present invention, multiple Java Native Interface calls are dispatched by identifying a sequence of Java Native Interface calls to be made by native code, by encapsulating the identified sequence of Java Native Interface calls into a batch, and by communicating the batch as a single transition across the Java Native Interface boundary. Encapsulation of the identified sequence of Java Native Interface calls into a batch may comprise iteratively processing each Java Native Interface call to be made by: identifying the Java Native Interface function to call, identifying the arguments to pass into the Java Native Interface function, dispatching to the Java Native Interface function and capturing any returned value(s).

DETAILED DESCRIPTION

Various aspects of the present invention provide capabilities that reduce the number of transitions across call linkage conventions. For example, native software code operating based upon a first calling convention can dispatch multiple Java Native Interface calls for execution by a Java Virtual Machine operating on a second calling convention while only having to cross the Java Native Interface boundary from native code to the Java Virtual Machine a single time for a logical sequence of calls. As a result, native software code can take advantage of Java capabilities in an efficient manner. According to further aspects of the present invention, multiple calls from a native method into Java are grouped/batched together into a single request such that the batch only has to cross the Java Native Interface boundary one time, thus reducing the overhead otherwise associated with performing a separate Java Native Interface call for each call in the batch.

Figure 1:
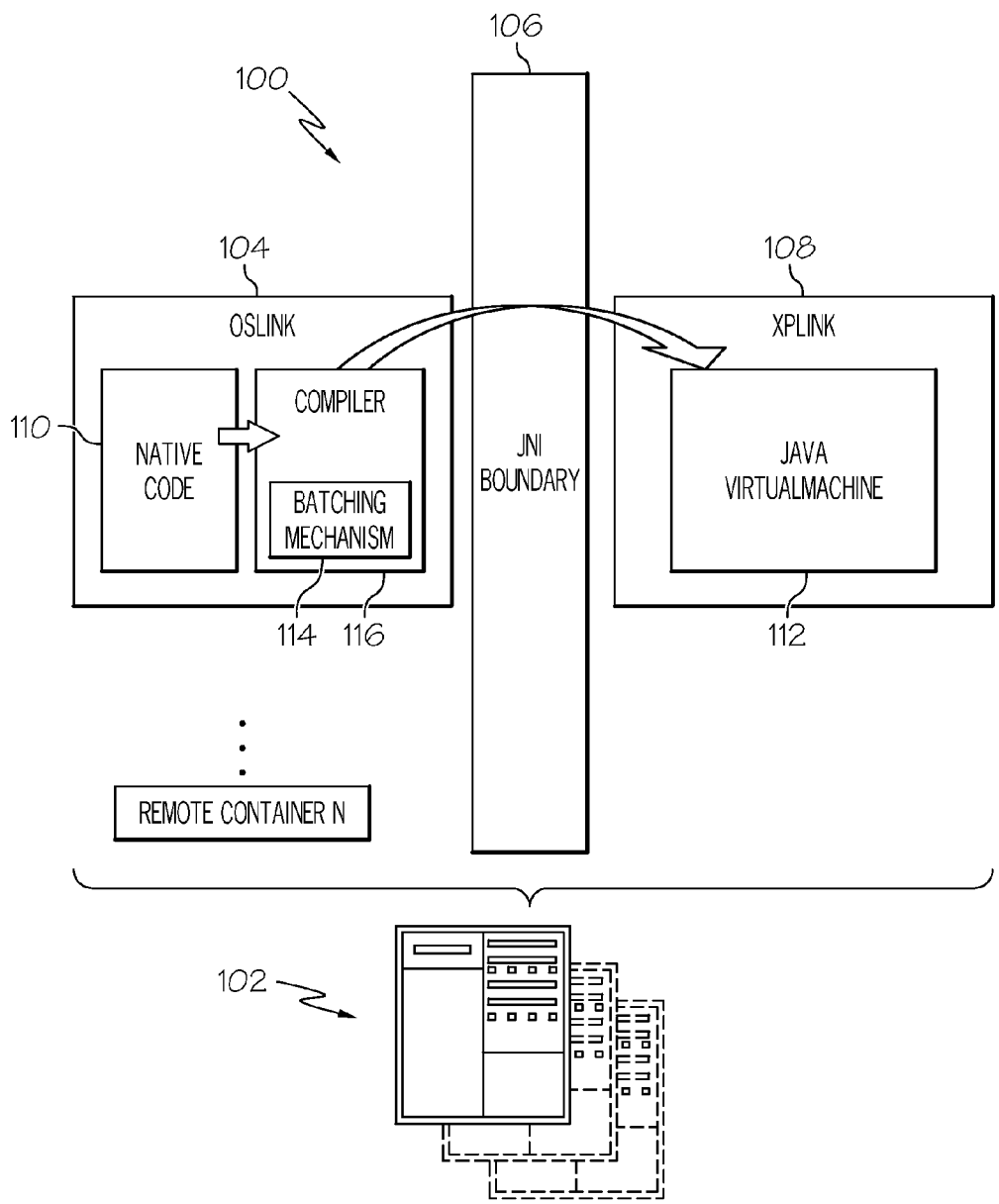
FIG. 1 is a schematic block diagram illustrating an exemplary approach for dispatching multiple Java Native Interface calls, according to aspects of the present invention.

Referring now to the drawings, and in particular to FIG. 1, a system 100 is illustrated according to various aspects of the present invention. The system 100 may be implemented on a single processing device 102. Alternatively, the system 100 can be distributed across multiple processing devices 102 that are communicably connected together, such as by a network. A typical processing device 102 may include for example, a physical device such as: a server computer, a personal computer, a notebook computer, a transactional system, a purpose-driven appliance, a pervasive computing device such as a personal data assistant (PDA), a palm computer, a cellular access processing device, a smart phone, a tablet computer, a special purpose computing device, any other device capable of executing computer code, etc. In this regard, each processing device 102 may comprise hardware and/or software processing components for carrying out aspects of the invention as described in greater detail herein.

Still further, aspects of the system 100 may be distributed across multiple software processing components, which may all reside in a single physical machine, or multiple software processing components may be distributed in various combinations across any number of physical machines. The system 100 is thus shown by way of illustration, and not by way of limitation, as a computing system in which various aspects of the present invention may be practiced.

Regardless of the physical hardware implementation, a first space 104 that is operating under a first calling convention is separated by a Java Native Interface boundary 106 from a second space 108 that is operating under a second calling convention that is different from the first calling convention. By way of illustration, and not by way of limitation, the first calling convention may comprise the OSLINK calling convention, and the second calling convention may comprise the XPLINK calling convention. The Java Native Interface provides a mechanism for native code 110 in the first space 104 to interact with a Java Virtual Machine 112 in the second space 108.

The native code 110 in the first space 104 and the Java code in the second space 108 may be executed in the same physical environment, e.g., in the same process and by the same thread, such as by transitioning execution between the native code and the Java code. The Java Virtual Machine 112 may alternatively be distributed, e.g., utilizing one or more remote execution containers to execute native code as will be described in greater detail herein.

The Batching Mechanism:

Various aspects of the present invention provide a batching mechanism 114 to dispatch multiple Java Native Interface calls into a batch such that the Java Native Interface boundary 106 is crossed from native code 110 to the Java Virtual Machine 112 a single time for all of the Java Native Interface calls grouped within the same batch.

As illustrated, the batching mechanism 114 is located on the native code side of the Java Native Interface boundary 106. However, according to various aspects of the present invention, the batching mechanism 114 is implemented such that the original native code 110 does not have to be modified. Thus, an associated system does not need to be re-architected. Rather, the batching mechanism 114 may be integrated, for example, with a compiler 116 that is capable of utilizing the batching mechanism 114. As such, existing native code 110 may only require recompiling with the compiler 116 to take advantage of the batching mechanism 114 described more fully herein.

The batching mechanism 114 creates a function outside of the Java Virtual Machine 112 that batches together and encapsulates multiple logically sequenced Java Native Interface calls. The created function then calls into the Java Virtual Machine 112 for execution of the function calls by the Java Virtual Machine 112, as will be described in greater detail herein.

Illustrative Example: Batch Mechanism for Enterprise COBOL for z/OS:

More and more legacy z/OS COBOL applications are taking advantage of the Object Oriented features of Enterprise COBOL for z/OS in order to leverage the services accessible to Java applications. Enterprise COBOL for z/OS enables a COBOL application to call Java methods using the Java Native Interface. However, COBOL Native code 110 is compiled by the COBOL compiler using the OSLINK calling convention, which utilizes an upward growing stack. To the contrary, the Java Virtual Machine 112 and hence, the Java Native Interface function implementations are compiled using the XPLINK calling convention, which utilizes a downward growing stack. The Java Virtual Machine 112 is compiled with the XPLINK calling convention because the XPLINK calling convention typically out-performs the older OSLINK calling convention. However, COBOL code remains compiled using the older OSLINK calling convention for legacy reasons. Various aspects of the present invention reduce the number of transitions a native application makes across the Java Native Interface boundary 106, e.g., to reduce the number of transitions an Enterprise COBOL application makes from the OSLINK calling convention to the XPLINK calling convention across the Java Native Interface boundary 106. Moreover, according to further aspects of the present invention, a native application utilizes the batch mechanism 114 to make the transition from the OSLINK calling convention to the XPLINK calling convention by crossing the Java Native Interface boundary 106 a single time for a logical sequence of Java Native Interface calls. As such, aspects of the present invention can increase the performance of native code that calls into Java, including for example, COBOL applications, by reducing the penalty that must be incurred by performance-intensive stack-swapping services, such as services that implement "glue code," each time native code invokes a Java method.

Figure 2:
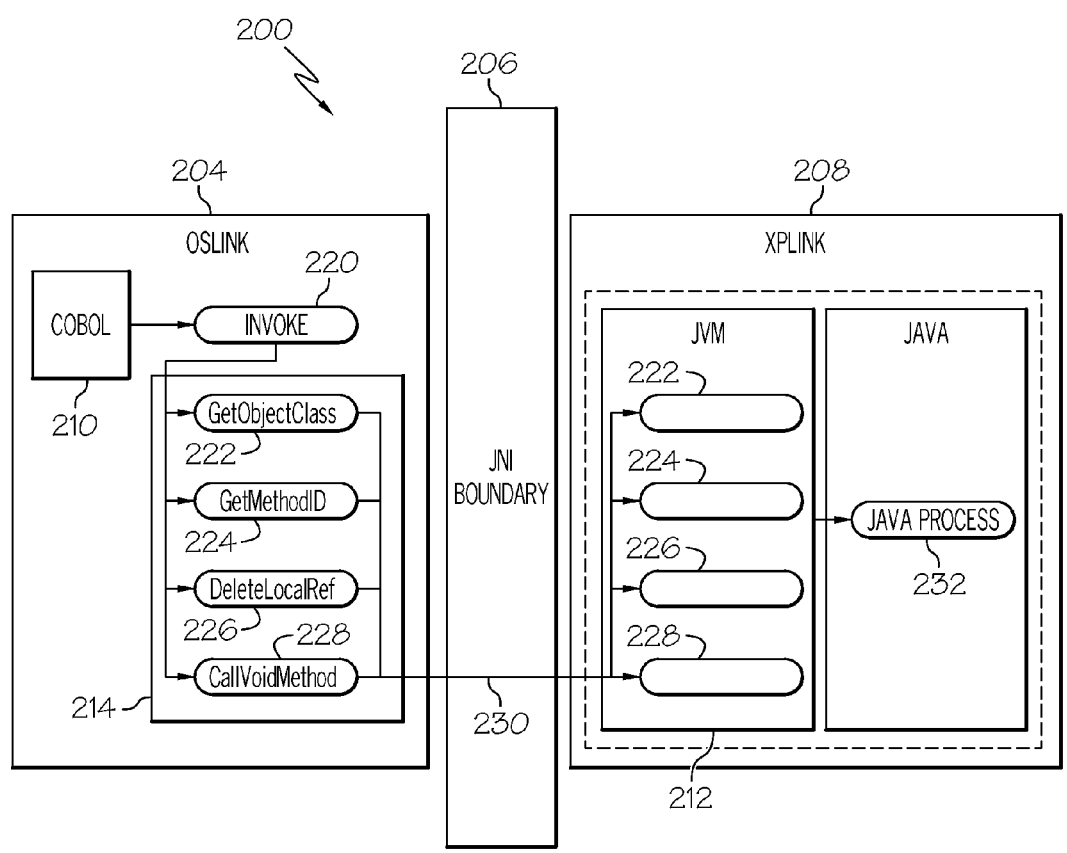
FIG. 2 is a schematic block diagram illustrating an exemplary approach for dispatching multiple Java Native Interface calls in the context of using COBOL native code, according to aspects of the present invention.

Referring to FIG. 2, a system 200 is illustrated, which is suitable for reducing transitions across the Java Native Interface boundary in the exemplary context of a COBOL application. The system 200 includes components that are generally analogous to corresponding components in the system 100 described with reference to FIG. 1. Moreover, the example is provided in the context of a COBOL application for purposes of illustration, and not by way of limitation, to demonstrate aspects of batch processing described more fully herein.

In the exemplary system 200, a first space 204 that utilizes the OSLINK calling convention is separated by a Java Native Interface boundary 206 from a second space 208 that utilizes the XPLINK calling convention. As an example, assume that a z/OS Enterprise COBOL application 210 within the first space 204 intends to gain access to services of a Java application on a Java Virtual Machine 212 in the second space 208 by calling Java methods using the Java Native Interface. The native code in the first space 204 may be in a separate process from the Java Virtual Machine in 212. In this sense the native code in the first space 204 would be considered a remote execution container. Furthermore, there may be several remote execution containers.

To implement a Java method from COBOL using the INVOKE statement, four Java Native Interface calls are typically required for setup, execution and cleanup. Each of the four required calls conventionally requires a transition across the Java Native Interface boundary 206, thus requiring the performance of a computationally costly series of operations. However, by using the batching mechanism 214 as will be described in greater detail herein, only one transition across the Java Native Interface boundary is required to complete the sequence of four Java Native Interface calls.

The COBOL application 210 executes an INVOKE command 220 that is comprised of four Java Native Interface calls, including GetObjectClass 222, GetMethodID 224, DeleteLocalRef 226 and CallVoidMethod 228. In an illustrative example, the COBOL compiler recognizes these four Java Native Interface calls 222, 224, 226, 228 as a logical sequence of interface calls and encapsulates the four Java Native Interface calls 222, 224, 226, 228 into a single transition 230 that is communicated across the Java Native Interface boundary 206. On the Java Virtual Machine side of the Java Native Interface boundary 206, the Java Native Interface calls 222, 224, 226, 228 within the batch are un-encapsulated and are executed by a Java process 232 in the proper sequence.

The batching mechanism 214 can execute, for instance, up to and including 15% faster than the conventional approach of crossing the Java Native Interface boundary 206 separately for each Java Native Interface call. However, an improvement in excess of 15% is also possible. In this illustrative example, COBOL source code does not need to be changed to take advantage of the batching mechanism 214. Rather, as an example, the existing COBOL source code can be recompiled using a modified COBOL compiler that is configured to implement the batching mechanism.

Figure 3:
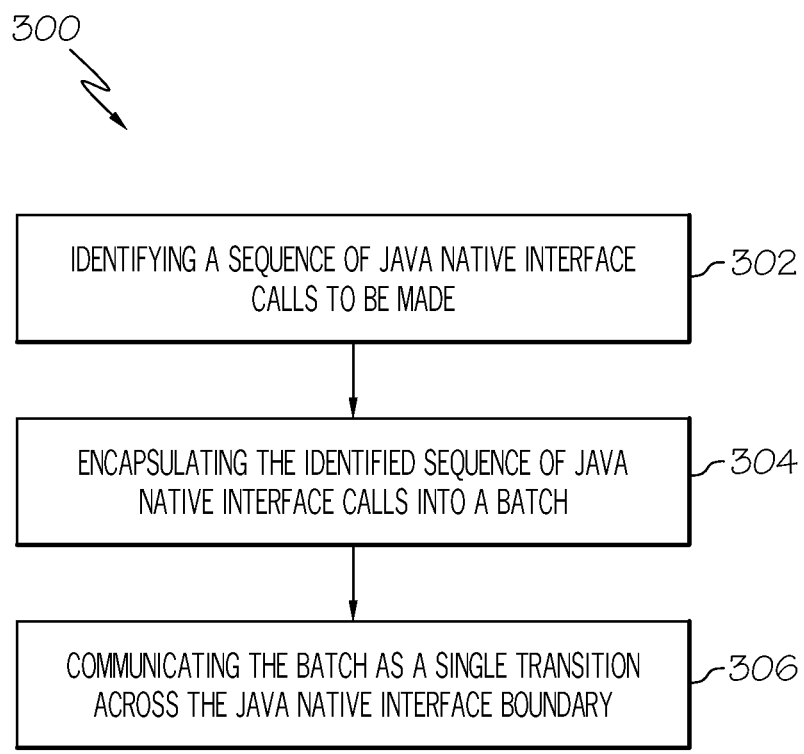
FIG. 3 is a flow chart illustrating an approach for batching multiple Java Native Interface calls into a batch file, according to various aspects of the present invention.

Referring now to FIG. 3, an exemplary method 300 of dispatching multiple Java Native Interface calls is illustrated. The method 300 may be executed by the batching mechanism 114, 214, e.g., as illustrated in FIGS. 1 and/or 2. Moreover, the method 300 may be embodied, for example, as a computer program product comprising a computer readable storage medium having computer readable program code thereon, which is configured to implement the below described method of dispatching multiple Java Native Interface calls. Further, the method 300 may be implemented by a processor of a computing device executing instructions stored in a tangible, physical memory device. For instance, the computer readable program code may be executed by a physical, tangible embodiment of the processing device 102, as illustrated in FIG. 1. The method 300 may be used, for example, to reduce the number of transitions across a Java Native Interface boundary from native code to a corresponding Java Virtual Machine.

The method comprises identifying a sequence of Java Native Interface calls to be made at 302 and processing each call at 304 by encapsulating the identified sequence of Java Native Interface calls into a batch. The method still further comprises communicating the batch as a single transition across the Java Native Interface boundary at 306.

Figure 4:
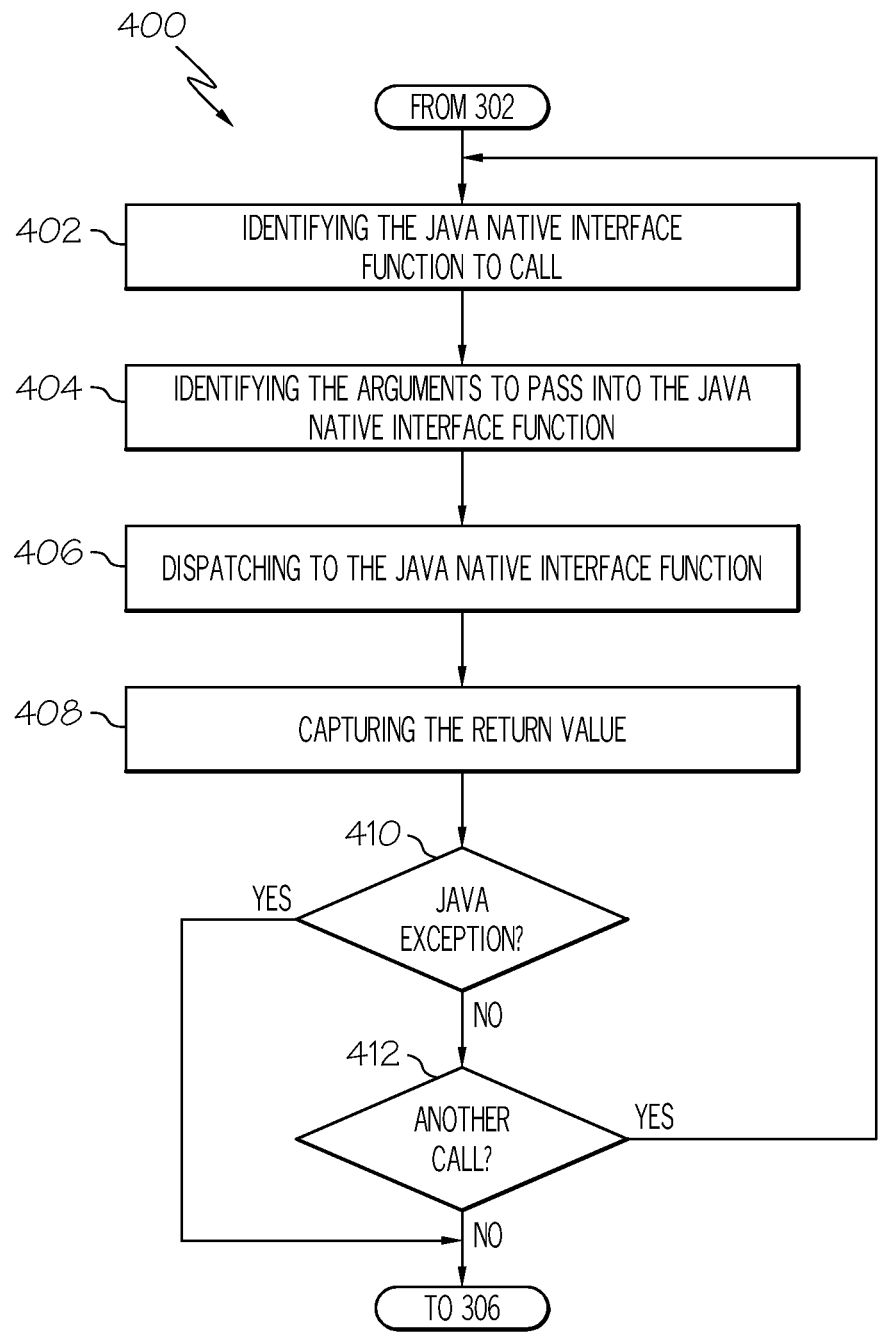
FIG. 4 is a flow chart illustrating an exemplary approach for encapsulating multiple Java Native Interface calls, according to various aspects of the present invention.

Referring to FIG. 4, a method 400 of processing each call, e.g., as recited at 304 of FIG. 3, is illustrated. The method 400 comprises processing each call of the sequence iteratively. Each call is processed by identifying the Java Native Interface function to call at 402 and identifying any argument(s) to pass into the Java Native Interface function at 404. The iterative process further comprises dispatching to the Java Native Interface function at 406 and capturing any return value(s) at 408.

The method 400 may further comprise detecting if the Java Native Interface function call resulted in a Java exception being thrown at 410 and stopping the process so as to not invoke the next call in the sequence if a Java exception was thrown. In this regard, the method 400 may also further comprise communicating an exception error back to the caller of the sequence that resulted in the Java exception, and/or taking other appropriate action.

A decision is made at 412 as to whether there is another call to process. If there is another call to process and a Java exception has not been thrown, then the method loops back to identify the next Java Native Interface function to call at 402. The iterative process continues until there are no further identified calls to process.

Some function calls will return values. Moreover, certain calls require inputs returned from previous calls. As such, identifying the arguments to pass into the Java Native Interface function at 404 may further comprise processing any required returned values and/or inputs, such as by mapping a return value from a previous call in the sequence to be passed as an argument in a subsequent call. The handling of returned values and required inputs is described in greater detail herein.

Distributed Java Virtual Machine:

Referring generally to FIGS. 1 and 2, as noted above, the native code 110, 210 in the first space 104, 204 and the Java code in the second space 108, 208, may be executed in the same process and by the same thread, e.g. by transitioning execution between the native code and the Java code. Alternatively, the native code 110, 210 may be executed in a separate process from the Java Virtual Machine 112, 212. In this sense, the native code 110, 210 of the first space 104, 204 can function as a remote execution container. Moreover, there may be several remote execution containers associated with a corresponding Java Virtual Machine 112, 212.

The remote execution container(s) may be co-located on the same physical processing device 102 that hosts the Java Virtual Machine 112. For instance, one or more remote execution containers, e.g., one or more instances of the native code 110, 210, may be executed in separate processes on the same physical processing device 102 that hosts the Java virtual machine 112, 212. Also, one or more remote execution containers may be located across multiple physical processing devices 102, which are communicably coupled together, such as by a network. Regardless of physical location, the native code is unaware that it is executing separately from the Java Virtual Machine.

The separation achieved by the distributed Java Virtual Machine implementations prevents misbehaved native code from destabilizing the Java Virtual Machine and enables running the native code in a different environment, e.g., having a different security context, different bit width, etc., relative to the associated Java Virtual Machine.

Moreover, various aspects of the present invention reduce the number of times the Java Native interface boundary is crossed from the native code in the remote execution container to the Java Virtual Machine, e.g., down to a single transition for a logical sequence of Java Native Interface calls, as described more fully herein. As such, the batching mechanism 114, 214 is particularly well suited for transitioning native code across the Java Native Interface boundary in distributed Java environments. For example, the batching mechanism 114, 214 reduces penalties associated with performance implications such as overhead and latency that arise, for example, where native code executing on a machine that is remote to an associated Java Virtual Machine dispatches multiple Java Native Interface calls to the Java Virtual Machine.

The above-example of reducing transitions across the Java Native Interface boundary in a distributed Java environment is presented by way of illustration, and not by way of limitation, of various aspects of the present invention. Other applications may alternatively be implemented.

Exemplary Batching Mechanism:

An exemplary batching mechanism, referred to herein as BatchJNICalls, may be utilized to implement the batching mechanism 114, 214 as illustrated in FIGS. 1 and 2 respectively. The examples discussed herein with reference to BatchJNICalls are presented to illustrate exemplary aspects of the present invention and should not be construed as limiting.

The signature of the exemplary batch mechanism implementing function may be expressed as:

```
jvalue JNICALL BatchJNICalls(JNIEnv * jnienv, struct JNI_CallBack_
Info *
jniCalls, jint numCalls, struct JNI_CallBack_Exception_Info
*exceptionInfo)
```

The caller, e.g., the compiler 116 as illustrated in FIG. 1 or another process, initiates the batching mechanism, BatchJNICalls. The call to the batching mechanism, BatchJNICalls, includes a Java Native Interface pointer (JNIEnv*jnienv) that allows interaction with the Java Native Interface environment from within the native method.

The call to the exemplary batching mechanism, BatchJNICalls, also includes an array (jniCalls) of Java Native Interface callback information structures (JNI_CallBack_Info) that is filled out for each desired Java Native Interface call. In an exemplary implementation, the Java Native Interface callback information structures are filled out in the order in which the calls are to be made. As an example, the caller may fill out a JNI_CallBack_Info structure for each Java Native Interface call that is to be made for a corresponding logical sequence of calls. Each JNI_CallBack_Info structure may then be inserted in the array of jniCalls, e.g., in the order in which the calls are to be made. The signature may also include exception handling information to address Java exceptions that may affect execution of the Java Native Interface calls. For instance, as illustrated, exception handling information, exceptionInfo, is stored in an exception handling information structure, JNI_CallBack_Exception_Info.

A Java Native Interface callback information argument map, e.g., JNI_CallBack_Info_Arg_Map, may be used to map return values from previous calls in the array of Java Native Interface calls, e.g., jniCalls, into the parameter list of other Java Native Interface calls in the array of Java Native Interface calls.

Exemplary Structure Definitions:

```
typedef struct JNI_CallBack_Info_Arg_Map {
  jint index; /* the index of the argument in the array of arguments
    in jniCalls */
  jvalue *address; /* address of the result in the JNI_CallBack_
    Info struct to map */
} JNI_CallBack_Info_Arg Map;
typedef struct JNI_CallBack_Info {
  jint callID;       /* the index in the Java Native Interface function table */
  jint numArgs;      /* the number of elements in the array or arguments */
  jvalue *args;      /* array of arguments */
  jvalue result;     /* storage for the result of the call */
  JNI_CallBack_Info_Arg_Map *argMap;
                     /* maps the return value from a previous call in this
                        sequence */
                     /* to the argument list of this call */
  jint numArgMaps;   /* the number of argMaps */
} JNI_CallBack_Info;
```

Figure 5:
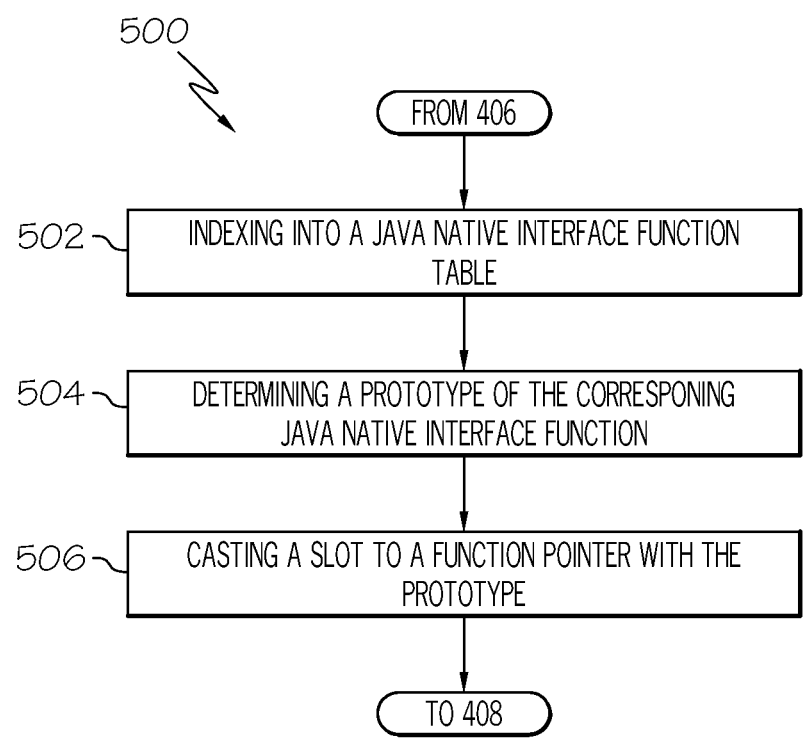
FIG. 5 is a flow chart illustrating an exemplary approach for using a lookup for dispatching a Java Native Interface function, according to aspects of the present invention.

Referring to FIG. 5, using the above structure definitions, an exemplary method 500 of dispatching to the Java Native Interface function, e.g., as illustrated at 406 of FIG. 4, may be implemented by indexing into a Java Native Interface function table by a specified amount at 502, determining a prototype of the corresponding Java Native Interface function determined from the function table at 504 and casting a slot to a function pointer with the prototype at 506. As an illustrative example, indexing into the Java Native Interface function table may be implemented by an amount specified by a call identifier parameter, e.g., callID, established by the user.

In this regard, casting statements may be provided for each Java Native Interface function. Alternatively, prototypes may be normalized so as to not differentiate between those Java Native Interface types, as will be described in greater detail below.

Example Code Fragments:

```
/******************************************************
* sample code fragments presented by way of illustration and not
* by way of limitation
******************************************************/
...
  static U_8 jniFunctionBatchPrototypes[ ] = {
...
  /* list out function prototypes, just one illustrative function listed here */
...
  JINT_JINT , /* jint (JNICALL * GetVersion)(JNIEnv *env); index: 4 */
...
  /* end of list of functions */
  }
...
jvalue JNICALL batchJNICalls(JNIEnv * jniEnv, struct JNI_CallBack_Info * jniCalls,
jint numCalls, struct JNI_CallBack_Exception_Info *exceptionInfo) {
...
  acquireVMResourceLock(jniEnv);
  /* index into the byte array using the JNI callID to find the prototype */
  for (thisCall = 0; thisCall < numCalls; thisCall++) {
    UDATA *slot;
    UDATA mapNum;
...
    /* index into the JNI env */
  slot = (UDATA *)((UDATA)(*jniEnv) + sizeof(void *) * (jniCalls[thisCall].CallID));
  /* map return values from previous calls in this batch to parameters of current call */
  for (mapNum = 0; mapNum < jniCalls[thisCall].numArgMaps; mapNum++) {
       jniCalls[thisCall].args[jniCalls[thisCall].argMap[mapNum].index] =
       *(jvalue *)(jniCalls[thisCall].argMap[mapNum].address);
     }
     switch (jniFunctionBatchPrototypes[jniCalls[thisCall].CallID]) {
...
       case JDOUBLE_JINT_JINT_JINT:
         jniCalls[thisCall].result.d =
           ((jdouble(JNICALL*)(jint, jint, jint)) (*slot))(
              jniCalls[thisCall].args[0].i,
              jniCalls[thisCall].args[1].i,
              jniCalls[thisCall].args[2].i);
       break;
...
  /* other cases listed here */
```

The Java Native Interface specification can comprise a plurality of functions. For instance, over 230 functions may be available (only one is illustrated in the example code above). However, providing large number of separate casting statements may not be necessary in certain implementations. For instance, according to aspects of the present invention, a method for determining a prototype at 504 of the corresponding Java Native Interface function comprises implementing a normalization that does not differentiate between prototypes if such prototypes have the same storage size and are stored in the same type of register. For instance, register types may comprise general purpose registers (GPR) and floating point registers (FPR).

Determining a prototype of the corresponding Java Native Interface function may further comprise determining the prototype corresponding to the callID by accessing an array of constants where the constant value at the index of the callID identifies which prototype to use. In an illustrative example, on 31-bit z/OS, 19 prototypes may be implemented, a few illustrative prototypes are described below. Normalization facilitates quickly determining the prototype corresponding to the callID, e.g., by accessing an array of constants where the constant value at the index of the callID identifies which prototype to use.

As an illustrative example, the batch mechanism may identify the callID and prototype as follows:

element of the args array in the JNI_CallBack_Info structure as the args parameter to the Call<type>MethodA function.

Batch Mechanism for Distributed Java Virtual Machine:

In the case of the Distributed Java Virtual Machine, the Remote Execution Container only needs to transmit one request from the remote machine to the machine hosting the Java Virtual Machine for a sequence of Java Native Interface calls instead of a separate transmission for each Java Native Interface function call. Conversely, the Java Virtual Machine only needs to conduct one transmission of return values to the Remote Execution Container instead of one for each Java Native Interface call in the sequence.

Optimizations:

Various aspects of the present invention create a foundation for optimizations that can be made to the Java Native Interface calls specified to BatchJNICalls. For instance, an optimization coarsens the granularity of Java Virtual Machine resource locks. Instead of acquiring and releasing Java Virtual Machine resource locks for each Java Native Interface call, a single resource lock is acquired at the start of the BatchJNICalls routine, and the resource lock is released at the end of BatchJNICalls.

As an illustration, a call from native code to BatchJNICalls may specify, for example, that Java Native Interface calls (a,b,c,d) are to be made. Conventionally, these four Java Native Interface calls (a,b,c,d) are made individually from

```
/* list out function prototypes, just a few illustrative functions listed here */
...
JINT_JINT , /* jint (JNICALL * GetVersion)(JNIEnv *env); index: 4 */
...
JINT_JINT_JINT , /* jclass (JNICALL * GetSuperclass)(JNIEnv *env, jclass clazz); index: 10 */
...
JFLOAT_JINT_JINT_JINT_JINT , /* jfloat (JNICALL * CallFloatMethodA)(JNIEnv *env, jobject obj, jmethodID methodID, jvalue *args); index: 57 */
JDOUBLE_JINT_JINT_JINT_JINT , /*    jdouble (JNICALL * CallDoubleMethod)(JNIEnv *env, jobject obj, jmethodID methodID, ...); index: 58 */
...
JINT_JINT_JINT_JLONG , /* jbyteArray (JNICALL * NewNativeHeapByteArray)(JNIEnv* env, void* address, jlong capacity); index: 233 */
...
/* end of list */
```

In an illustrative example, the Java Native Interface functions used to invoke Java methods come in three forms, as follows:

```
NativeType Call<type>Method(JNIEnv *env, jobject obj,jmethodID methodID, ...);
NativeType Call<type>MethodA(JNIEnv *env, jobject obj, jmethodID methodID, jvalue *args);
NativeType Call<type>MethodV(JNIEnv *env, jobject obj, jmethodID methodID, va_list args);
```

The Call<type>Method (variadic) form may complicate certain implementations. For instance, the batching mechanism, e.g., BatchJNICalls, may not, itself, be a variadic function. Under this arrangement, it may not be possible to create a va_list and dispatch to the variadic Call<type>Method form. To get around this, in an illustrative example, the BatchJNICalls implementation detects when the caller is calling the variadic form and instead dispatches to the Call-MethodA equivalent, passing in the address of the fourth native code. As such, the Java Virtual Machine must acquire and release resource locks for each of the Java Native Interface calls (a,b,c,d) individually. However, according to aspects of the present invention, the Java Virtual Machine resource locks only need to be acquired a single time, before executing Java Native Interface call (a). Correspondingly, the Java Virtual Machine is only required to release the resource lock a single time: once Java Native Interface call (d) completes in this illustrative example.

Another optimization comprises optimizing specific sequences of Java Native Interface calls by removing the creation of intermediate resources that are not needed by the caller. Consider the sequence of Java Native Interface calls generated by the COBOL compiler in response to the COBOL INVOKE statement: (1) GetObjectClass, (2) GetMethodID, (3) DeleteLocalRef, (4) Call<type>Method. The local reference created by GetObjectClass is not needed because it gets discarded in DeleteLocalRef. Therefore, a system according to aspects described herein, does not need to incur the resource and/or record keeping overhead for the local reference. As such, the system may remove the need for the DeleteLocalRef call. In an illustrative exemplary implementation, after recognizing the sequence, BatchJNICalls optimizes the dispatch to the Java method specified by Call<type>Method.

Still further, another optimization comprises generating optimized call-in thunks per call-site in COBOL. The Just-In-Time (JIT) compiler can analyze the parameters passed to BatchJNICalls and generate an optimized call-in thunk. BatchJNICalls would return this thunk to the caller in native code to be used the next time BatchJNICalls is invoked from the same callsite. In some cases, the thunk could remove the need to transition from OS linkage to XPLink altogether.

Thus, various aspects of the present invention address the actual calls to Java Native Interface functions by grouping Java Native Interface calls into a single request. Moreover, aspects of the present invention do not reduce the use of Java Native Interface function calls themselves. Rather, approaches are provided to reduce the overhead associated with calling Java Native Interface function calls by grouping such calls into a single request. Moreover, systems including native programming language code that call into Java do not need to be re-architected to take advantage of the efficiencies described herein.

According to aspects of the present invention, Java Native Interface functions are called by the native code, and no knowledge of any Java Virtual Machine implementation-dependant internals is required. However, by using the batch mechanism, performance costs are avoided that would otherwise repeatedly occur for each Java Native Interface call because a plurality of Java Native Interface calls are batched together into one call.

According to aspects of the present invention, methods and computer program products are provided for improving performance in accessing the Java Virtual Machine from native language code through the Java Native Interface boundary by generating a single call, e.g., BatchJNICalls, by the caller such as a compiler, to batch multiple Java Native Interface calls together, to dispatch multiple Java Native Interface calls from the native code with only one transition from native code, e.g., OSLINK, to the Java Virtual Machine, e.g., XPLINK, or to the machine hosting the Java Virtual Machine (in case of distributed Java Virtual Machine). Calls to the BatchJNICalls have a specific prototype to specify the sequence of Java Native Interface calls to be made. Moreover, for each call, the BatchJNICalls is able to: identify the Java Native Interface function to call and the arguments to pass, dispatch to the Java Native Interface function, capture return value(s) and detect Java exception(s).

According to further aspects of the present invention, methods and computer program products utilize an Abstract Syntax Tree-like approach to encode a complex request to the Java Native Interface, thereby allowing the Java Virtual Machine to satisfy the request with a single Java Native Interface call. Each Java Native Interface call has a sizeable cost. As such, processing efficiency is realized.

Figure 6:
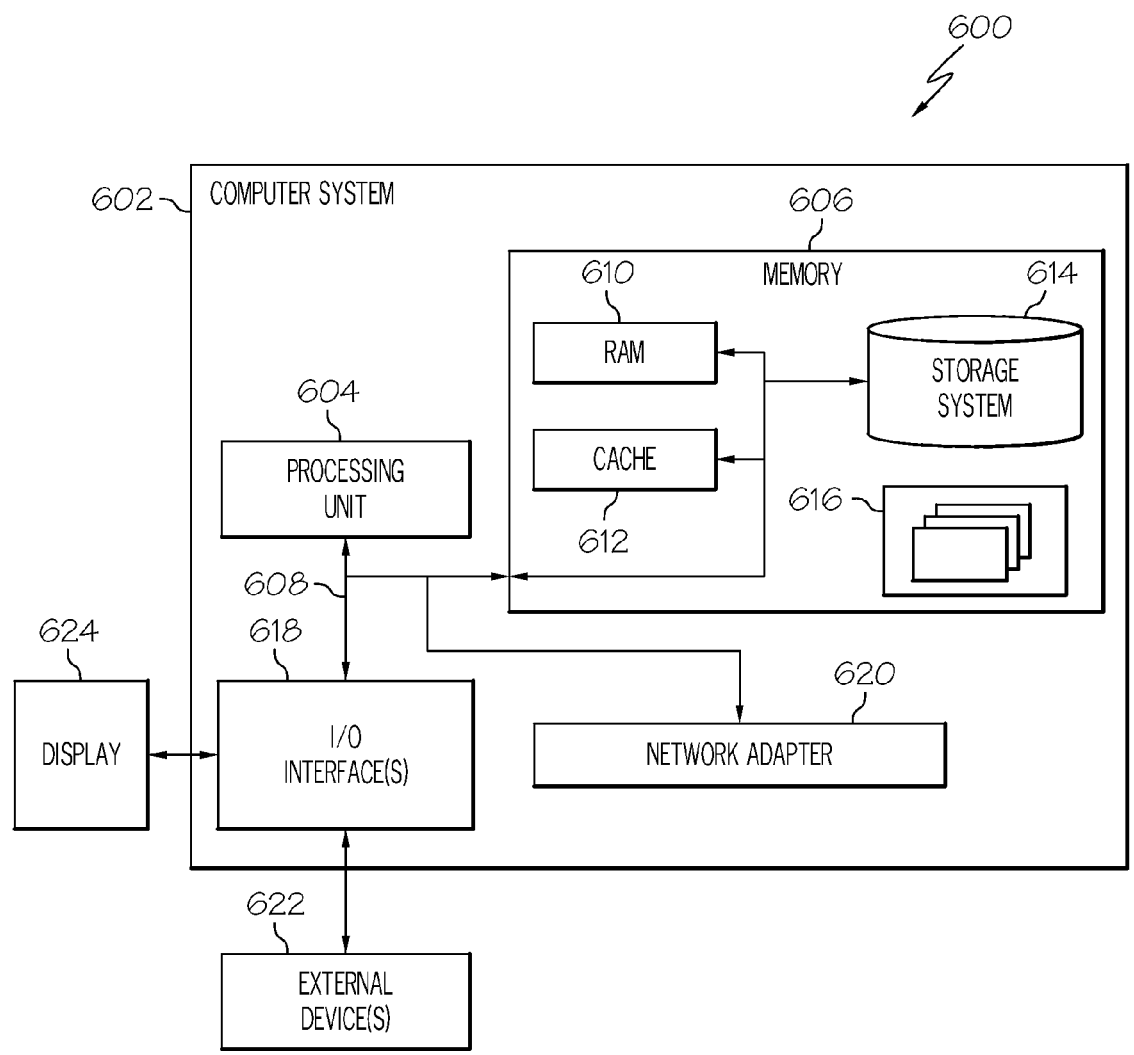
FIG. 6 is a block diagram of a computer system having a computer readable storage medium, the computer system suitable for storing and/or executing computer code that implements various aspects of the present invention as described in greater detail herein.

Referring to FIG. 6, a block diagram of a data processing system 600 implemented as a computer system 602, is depicted in accordance with aspects of the present invention.

The computer system 602 is operational with numerous general purpose or special purpose computing system environments or configurations. Moreover, the computer system 602 may be described in the general context of computer system executable instructions, such as program modules, being executed by a computer system. Generally, program modules may include routines, programs, objects, components, logic, data structures, and so on that perform particular tasks or implement particular abstract data types.

The components of the computer system 602 may include, but are not limited to, one or more processors or processing units 604, such as a symmetric multiprocessor (SMP) system or other configuration including a plurality of processors connected to the system bus. Alternatively, a single processor may be employed. Components of the computer system 602 further include a system memory 606, and a bus 608 that couples various system components including system memory 606 to the processor(s) 604. The memory 606 can include computer system readable media in the form of volatile memory, such as random access memory (RAM) 610 and/or cache memory 612. The memory 606 may also include other removable/non-removable, volatile/non-volatile computer system storage media, such as a storage system 614, e.g., one or more hard drives. Memory 606 may also include at least one computer readable storage medium 616 having computer readable program code embodied therewith, the computer readable program code comprising computer readable program code configured to carry out the functions of embodiments of the invention described more fully herein.

The computer system 602 may also comprise input/output (I/O) interface(s) 618 and/or a network adapter 620 that communicate with the processor 604 across the bus 608. The computer system 602 may also interface with external devices 622 and/or a display 624. Other hardware and/or software components could be used in conjunction with computer system 602.

The data processing system may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method of dispatching multiple Java Native Interface calls comprising:

identifying a sequence of Java Native Interface calls to be made by native code;

determining if the sequence of Java Native Interface calls includes overhead for creating a local reference of an intermediate object and subsequent removal of that local reference;

omitting Java Native Interface calls that include overhead for creating the local reference of an intermediate object and subsequent removal of that local reference from the sequence;

encapsulating the sequence of Java Native Interface calls into a batch; and wherein each call of the batch is encapsulated by iteratively performing for each call to be made:
   identifying the Java Native Interface function to call;
   identifying the arguments to pass into the Java Native Interface function;
   dispatching to the Java Native Interface function; and
   capturing the return value.

2. The method of claim 1, further comprising:
detecting if the Java Native Interface function call resulted in a Java exception being thrown; and
stopping the process so as to not invoke the next call in the sequence.

3. The method of claim 2, further comprising:
communicating back to the caller of the call in the sequence that resulted in the Java exception.

4. The method of claim 1, wherein dispatching to the Java Native Interface function comprises:
determining a Java Native Interface function by indexing into a Java Native Interface function table by a specified amount based on a call identifier parameter associated with the call;
determining a prototype corresponding to the Java Native Interface function determined from indexing the function table; and
casting a slot to a function pointer with the determined prototype.

5. The method of claim 4, wherein determining a prototype of the corresponding Java Native Interface function comprises:
normalizing specified prototypes so as to not differentiate between prototypes if such prototypes:
have the same storage size; and
are stored in the same type of register.

6. The method of claim 4, wherein determining a prototype of the corresponding Java Native Interface function comprises:
determining the prototype corresponding to a call identifier by accessing an array of constants where the constant value at the index of the call identifier identifies which prototype to use.

7. The method of claim 1, wherein identifying a sequence of Java Native Interface calls to be made by native code comprises:
filling out a Java Native Interface callback information structure for each desired Java Native Interface call; and
inserting each filled out Java Native Interface callback information structure in an array of Java Native Interface calls, in the order in which the calls are to be made.

8. The method of claim 7, further comprising:
using a Java Native Interface callback information argument map to map return values from previous calls in the array of Java Native Interface calls into the parameter list of other Java Native Interface calls in the array of Java Native Interface calls.

9. The method of claim 1, further comprising:
acquiring a single Java Virtual Machine release lock for the Java Native Interface calls in the batch; and
releasing the single Java Virtual Machine release lock at the end of processing the batch.

10. A computer program product to dispatch multiple Java Native Interface calls comprising:
a tangible computer readable storage medium having computer readable program code embodied therewith, the computer readable program code comprising:
computer readable program code configured to identify a sequence of Java Native Interface calls to be made by native code;
computer readable program code configured to determine if the sequence of Java Native Interface calls includes overhead for creating a local reference of an intermediate object and subsequent removal of that local reference;
computer readable program code configured to omit Java Native Interface calls that include overhead for creating the local reference of an intermediate object and subsequent removal of that local reference from the sequence;
computer readable program code configured to encapsulate the sequence of Java Native Interface calls into a batch; and
computer readable program code configured to communicate the batch as a single transition across a Java Native Interface boundary;
wherein each call of the batch is encapsulated by computer readable program code configured to iteratively perform actions for each call to be made including:
   computer readable program code configured to identify the Java Native Interface function to call;
   computer readable program code configured to identify the arguments to pass into the Java Native Interface function;
   computer readable program code configured to dispatch to the Java Native Interface function; and
   computer readable program code configured to capture the return value.

11. The computer program product of claim 10, further comprising:
computer readable program code configured to detect if the Java Native Interface function call resulted in a Java exception being thrown; and
computer readable program code configured to stop the process so as to not invoke the next call in the sequence.

12. The computer program product of claim 11, further comprising:
computer readable program code configured to communicate back to the caller of the call in the sequence that resulted in the Java exception.

13. The computer program product of claim 10, wherein the computer readable program code configured to dispatch to the Java Native Interface function comprises:
computer readable program code configured to determining a Java Native Interface function by indexing into a Java Native Interface function table by a specified amount based on a call identifier parameter associated with the call;
computer readable program code configured to determine a prototype corresponding to the Java Native Interface function determined from indexing the function table; and
computer readable program code configured to cast a slot to a function pointer with the determined prototype.

14. The computer program product of claim 13, wherein the computer readable program code configured to determine a prototype of the corresponding Java Native Interface function comprises:
computer readable program code configured to normalize specified prototypes so as to not differentiate between prototypes if such prototypes:

have the same storage size; and are stored in the same type of register.

15. The computer program product of claim 13, wherein the computer readable program code configured to determine a prototype of the corresponding Java Native Interface function comprises:

computer readable program code configured to determine the prototype corresponding to a call identifiers by accessing an array of constants where the constant value at the index of the call identifier identifies which prototype to use.

16. The computer program product of claim 10, wherein the computer readable program code configured to identify a sequence of Java Native Interface calls to be made by native code comprises:

computer readable program code configured to fill out a Java Native Interface callback information structure for each desired Java Native Interface call; and computer readable program code configured to insert each filled out Java Native Interface callback information structure in an array of Java Native Interface calls, in the order in which the calls are to be made.

17. The computer program product of claim 16, further comprising:

computer readable program code configured to use a Java Native Interface callback information argument map to map return values from previous calls in the array of Java Native Interface calls into the parameter list of other Java Native Interface calls in the array of Java Native Interface calls.

18. The computer program product of claim 10, further comprising:

computer readable program code configured to acquire a single Java Virtual Machine release lock for the Java Native Interface calls in the batch; and computer readable program code configured to release the single Java Virtual Machine release lock at the end of processing the batch.

19. The method of claim 1 further including: generating a call-in thunk based on the sequence and parameters passed; and invoking the thunk when a second sequence with the same sequence of calls and parameters is identified, wherein the invoking occurs independently of crossing the Java Native Interface Boundary.

* * * * *